United States Patent [19]

Pai

[11] Patent Number: 5,039,054

[45] Date of Patent: Aug. 13, 1991

[54] SAFE HEIGHT-ADJUSTING DEVICE

[76] Inventor: I Pai, 1st Fl., No. 680, Min-Tsu E. Rd., Taipei, Taiwan

[21] Appl. No.: 456,658

[22] Filed: Dec. 29, 1989

[51] Int. Cl.5 .............. F16M 13/00

[52] U.S. Cl. .............. 248/423; 248/396; 108/146; 297/345

[58] Field of Search .............. 248/423, 159, 419, 396, 248/421, 407, 416, 409; 108/144, 146, 145; 297/345

[56] References Cited

U.S. PATENT DOCUMENTS

| | | | |
|---|---|---|---|
| 720,776 | 2/1903 | Bennett | 108/146 |
| 2,641,247 | 6/1953 | Genebach | 248/421 X |
| 3,460,793 | 8/1969 | Posh | 248/396 X |
| 4,247,071 | 1/1981 | Carella et al. | 248/396 |
| 4,561,621 | 12/1985 | Hill | 248/423 X |

FOREIGN PATENT DOCUMENTS

| | | | |
|---|---|---|---|
| 173169 | 7/1906 | Fed. Rep. of Germany | 248/419 |
| 688572 | 3/1953 | United Kingdom | 108/145 |

*Primary Examiner*—Karen J. Chotkowski

*Attorney, Agent, or Firm*—Cushman, Darby & Cushman

[57] ABSTRACT

A safe height-adjusting device includes two pairs of pivotally interconnected triangular plates which support the upper portion of a two-part body on the lower portion of the two-part body. When the height of the body is adjusted, the fingers of the user cannot be clamped between the plates.

2 Claims, 3 Drawing Sheets

SAFE HEIGHT-ADJUSTING DEVICE

BACKGROUND OF THE INVENTION

This invention relates to a height-adjusting device with pivotally interconnected supporting members for supporting the upper portion of a two-part body on the lower portion of the two-part body, more particularly to a safe height-adjusting device which cannot clamp the fingers of the user between the supporting members when adjusting the height of the upper portion.

Referring to FIG. 1, a conventional height-adjusting device includes two first supporting members (B), (only one is shown), and two second supporting members (C), (only one is shown), connected rotatably to the first supporting members (B) by a pivot shaft (A). A pivot pin (D) connects rotatably two toothed and curved positioning elements (E) to the first supporting members (B). A retaining shaft (C1) is secured to the second supporting members (C) and engaged with the selected notches (e) in the positioning elements (E) so as to interlock the first supporting members (B) and the second supporting members (C). The user can actuate a control lever (T) to drive the retaining shaft (C1) to engage within or disengage from the notches (e) in the positioning elements (E). The removal of the retaining shaft (C1) from the notches (e) in the positioning elements (E) allows for the rotation of the first supporting members (B) relative to the second supporting members (C) and the adjustment of the height of the device. Because the supporting members (B, C) look like the cutting blades of a pair of scissors, the fingers of the user may be clamped therebetween.

SUMMARY OF THE INVENTION

It is therefore the main object of this invention to provide a safe height-adjusting device which cannot clamp the fingers of the user between the supporting members when adjusting the height of the device.

According to this invention, a height-adjusting device is used to adjust the height of a two-part body. The body has an upper portion and a lower portion disposed under and spaced from the upper portion. The height-adjusting device includes two pairs of pivotally interconnected adjacent supporting members, and a locking mechanism for interlocking releasably the supporting members. Each of the supporting members is pivoted to one of the upper and lower portions at one end thereof and connected slidably to another of the upper and lower portions at the other end thereof. The locking mechanism includes a control lever movable between a first position and a second position relative to the upper portion. When the control lever is located at the first position, the supporting members are interlocked. When the control lever is located at the second position, the supporting members can rotate relative to each other. The height-adjusting device is characterized in that the supporting members are triangular plates which are shaped and interconnected pivotally at a selected position, so that the triangular plates cannot clamp the fingers of a user therebetween when adjusting the height of the upper portion.

BRIEF DESCRIPTION OF THE DRAWING

Other features and advantages of this invention will become apparent in the following detailed description of a preferred embodiment of this invention, with reference to the accompanying drawings in which.

DETAILED DESCRIPTION OF THE PREFERRED EMBODIMENT

Figure 1:
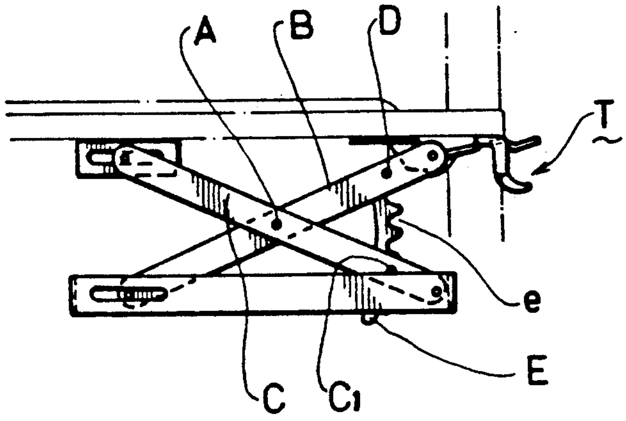
F I G.1 (PRIOR ART)
FIG. 1 is a side view of a conventional height-adjusting device.
Figure 2:
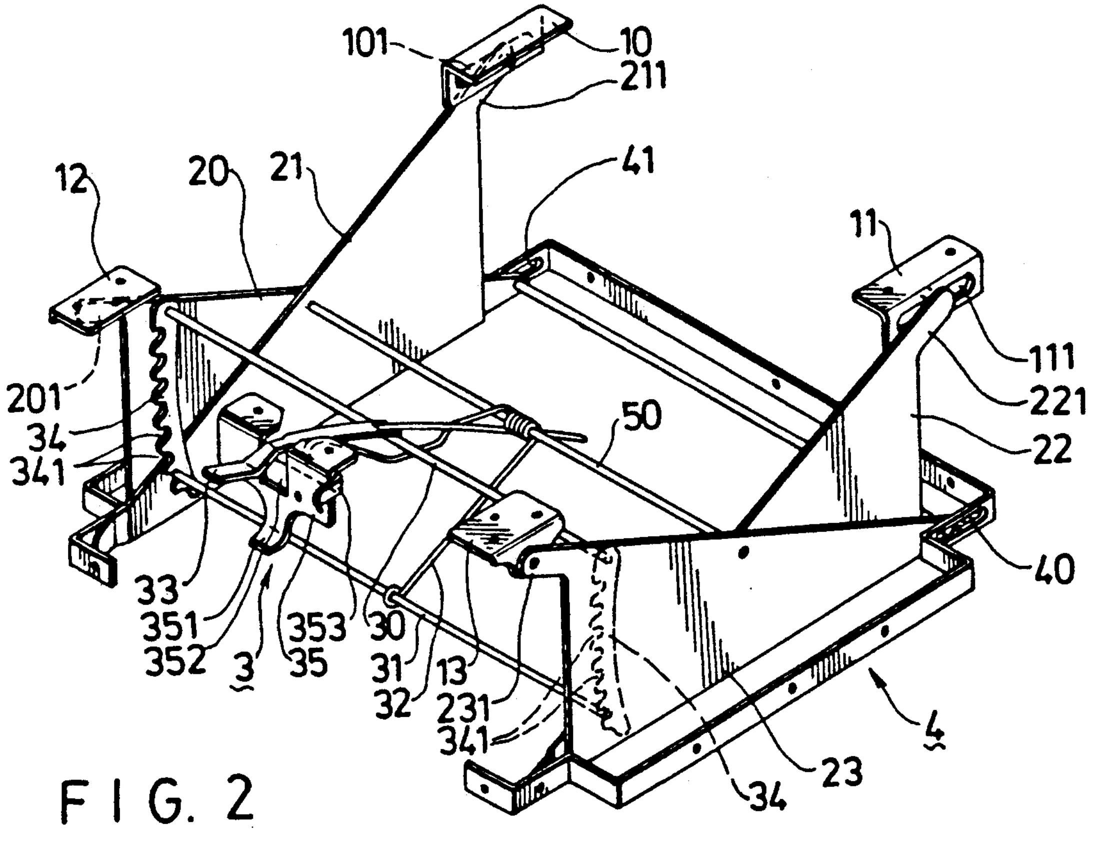
FIG. 2 is a perspective view of a safe height-adjusting device according to this invention.
Figure 3:
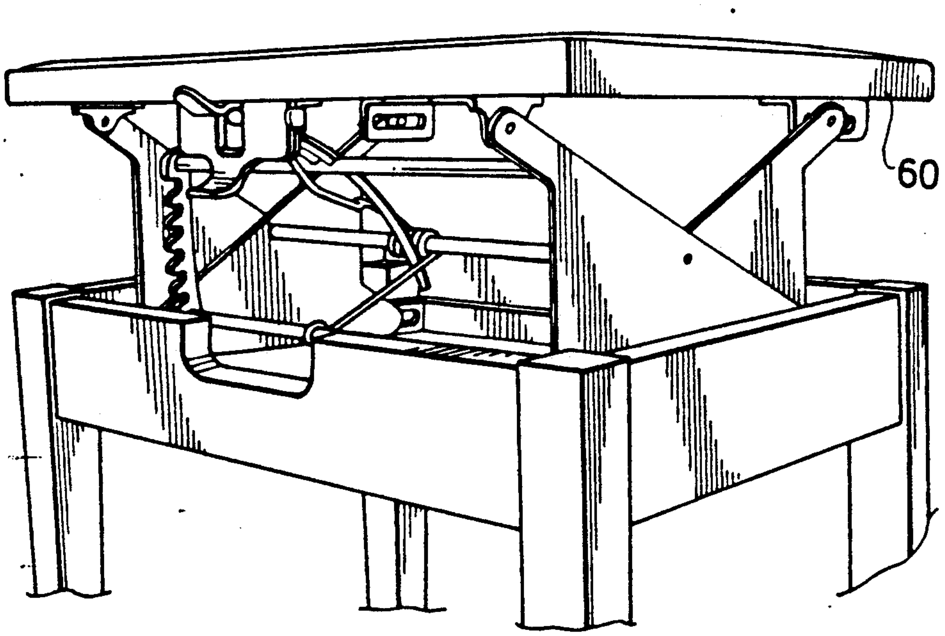
FIG. 3 is a schematic view illustrating how to utilize the safe height-adjusting device of this invention on a chair.
Figure 6:
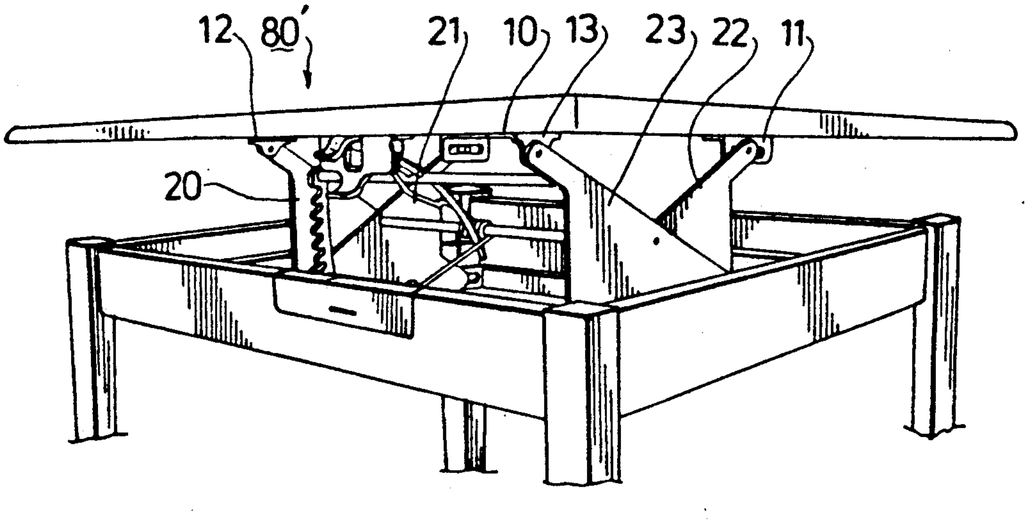
FIG. 6 is a schematic view illustrating how to utilize the safe height-adjusting device on a table.

Referring to FIG. 2, a safe height-adjusting device of this invention includes two slide slot members 10, 11 having slide slots 101, 111 formed therethrough, and two pivot hole members 12, 13 having pivot holes formed therethrough. The slide slot members 10, 11 and the pivot hole members 12, 13 are secured to the upper portion of a two-part body the height of which is to be adjusted. For example, the two-part body is a chair (see FIG. 3) consisting of a top plate 60 and a main body, or a table (see FIG. 6) consisting of a top plate 80′ and a main body.

Two inner plates 21, 22 and two outer plates 20, 23 are shaped in the form of a right-angled triangle. The hypotenuses of the inner plates 21, 22 have upper end lug portions 211, 221 connected slidably to the slide slot members 11, 12, and lower end portions connected pivotally to a mounting frame 4, which is fixed on the lower portion of the body to be adjusted. The hypotenuses of the outer plates 20, 23 have upper end lug portions 201, 231 connected pivotally to the pivot hole members 12, 13, and lower end portions received slidably in the slide slots 40, 41 of the mounting frame 4.

The middle portions of the hypotenuses of the inner plates 21, 22 and the outer plates 20, 23 are interconnected by a pivot shaft 50. The upper portions of the outer plates 20, 23 are interconnected securely by a connecting rod 30.

A locking mechanism 3 includes a retaining shaft 31 interconnecting securely the lower portions of the inner plates 21, 22, a torsion spring 32 sleeved on the connecting rod 30 so as to push a control lever 33 upward, and two toothed and curved positioning elements 34 sleeved rotatably on two end portions of the connecting rod 30 at the upper ends thereof. A generally Y-shaped member 35 is also secured to the upper portion of the body to be adjusted.

Figure 4A:
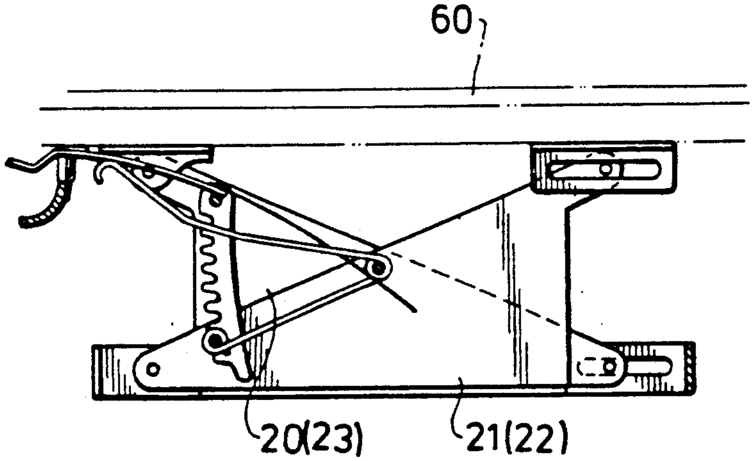
FIGS. 4A and 4B are schematic views illustrating the operation of the safe height-adjusting device of this invention.
Figure 4B:
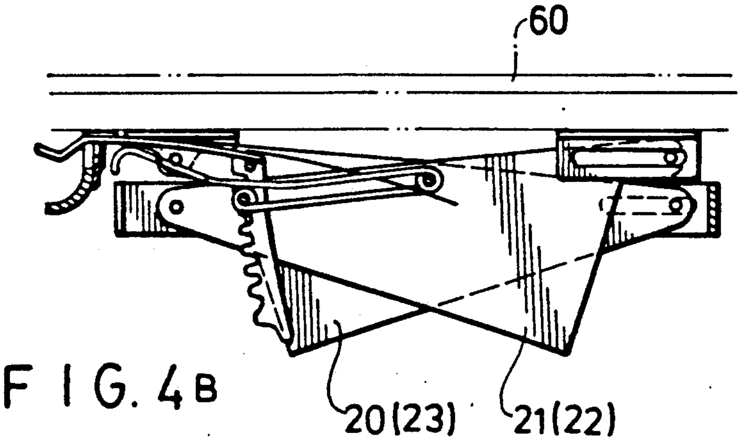

The Y-shaped member 35 includes a curved lower end portion 351, a guide slot 352 for guiding the control lever 33 to move longitudinally, and a horizontally movable lock bar 353. The user can contact the lower surface of the curved lower end portion 351 of the Y-shaped member 3, which is secured to the upper portion of the body to be adjusted, with the index finger of a hand and push the control lever 33 downward with the thumb of the same hand. As shown in FIG. 2, the location of the free end of the control lever 33 at the upper end of the guide slot 352 retains the retaining shaft 31 within the notches 341 in the positioning elements 34 so as to interlock the inner plates 21, 22 and the outer plates 20, 23. Normally, the lock bar 353 is moved into the guide slot 352 so as to prevent the free end of the control lever 33 from downward movement, thereby ensuring the engagement of the retaining shaft 31 with the notches 341 in the positioning elements 34. When the lock bar 353 is removed from the guide slot 352 and the free end of the control lever 33 is moved to the lower end of the guide slot 352, the retaining shaft 31 disengages from the notches 341 in the positioning elements 34, thus allowing for the relative rotation between the inner plates 21, 22 and the outer plates 20, 23. At this time, the user can move the curved lower end portion 351 of the Y-shaped member 35 upward or downward between the uppermost position shown in FIG. 4A and the lowermost position shown in FIG. 4B to adjust the height of the two-part body.

Figure 5:
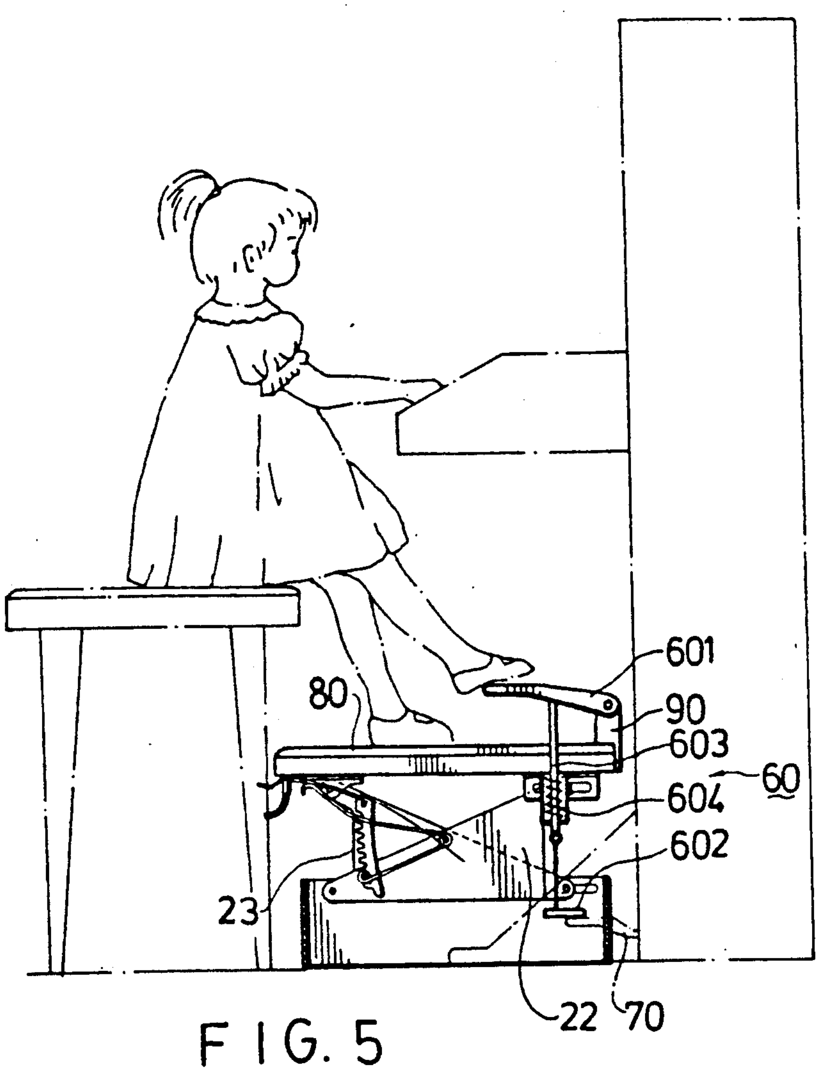
FIG. 5 is a schematic view illustrating how to utilize the safe height-adjusting device on a piano.

FIG. 5 illustrates the utilization of the safe height-adjusting device of this invention on a piano. When a child plays a piano, her feet are too short to step on the una corda pedal, the Sostenuto pedal and the damper pedal of the piano. As illustrated, in this case, the safe height-adjusting device of this invention can be placed between the piano pedal 70 and the child's feet and ascends a foot rest plate 80 to a suitable level. In this embodiment, a linkage 60 is provided on the safe height-adjusting device of this invention and includes an actuator pedal 601 mounted pivotally on the foot rest plate 80, a sliding rod 603 connected pivotally to the middle portion of the actuator pedal 601 at the upper end thereof and movable along a vertical path, a compression spring 604 biasing the sliding rod 603 to move upward, and a coupler 602 connected pivotally to the lower end of the sliding rod 503 and carrying a lower end pusher which can impel the piano pedal 70 downward. With the linkage interposed between the child and the piano pedal 70, the actuator pedal 601 can be operated by the child's feet to control the piano pedal 70.

It can be appropriated that it is impossible to clamp the fingers of the user between the triangular plates 20, 21, 22, 23 when adjusting the height of the device.

With this invention thus explained, it is apparent that numerous modifications and variations can be made without departing from the scope and spirit of this invention. It is therefore intended that this invention be limited only as indicated in the appended claims.

I claim:

1. A height-adjusting device for adjusting a height of a two-part body comprising:

an upper portion;

a lower portion disposed under and spaced apart from said upper portion;

a first pair of right-triangle shaped support plates having a hypotenuse forming one side thereof, each of said first support plate hypotenuse sides having a lower end pivotally and slidably connected to said lower portion, and an upper end pivotally connected to said upper portion;

a second pair of right-triangle shaped support plates having a hypotenuse forming one side thereof, wherein each of said triangular plates is pivotally connected to remainder of said triangular plates at a position near a middle portion of each of said hypotenuse sides, each of said second support plate hypotenuse sides having a lower end pivotally connected to said lower portion, and an upper end pivotally and slidably connected to said upper portion; and a locking mechanism capable of selectively locking and releasing said pairs of supporting members in fixed relation, said locking mechanism including a control lever movable between a first position and a second position relative to said upper portion, whereby moving said control lever to said first position locks said supporting members in fixed relation, and moving said control lever to said second position releases said supporting members from fixed relation, and whereby said triangular plates cannot clamp a finger of a user therebetween when adjusting the height of said upper portion.

2. A height-adjusting device for adjusting a height of a two-part body comprising:

an upper portion;

a lower portion disposed under and spaced apart from said upper portion;

a first pair of triangular shaped support plates, each of said first pair of triangular support plates having a lower end pivotally and slidably connected to said lower portion, and an upper end pivotally connected to said upper portion;

a second pair of triangular shaped support plates, pivotally interconnected with said first pair of triangular shaped support plates at a selected position, each of said second pair of triangular support plates having a lower end pivotally connected to said lower portion, and an upper end pivotally and slidably connected to said upper portion; and a locking mechanism capable of selectively locking and releasing said pairs of supporting members in fixed relation, said locking mechanism including a control lever movable between a first position and a second position relative to said upper portion, whereby moving said control lever to said first position locks said supporting members in fixed relation, and moving said control lever to said second position releases said supporting members from fixed relation, whereby said triangular plates cannot clamp a finger of a user therebetween when adjusting the height of said upper portion, wherein said upper portion of said body is a foot rest plate, said height-adjusting device including an actuator pedal mounted pivotally on an upper surface of said foot rest plate, a sliding rod connected pivotally to said actuator pedal at an upper end thereof and drivable by said actuator pedal to slide along a vertical path, a compression spring serving to bias said sliding rod upwardly, and a coupler connected pivotally to a lower end of said sliding rod at an upper end thereof and adapted to impel a piano pedal downward, said sliding rod extending through said foot rest plate, whereby the height of said foot rest plate can be adjusted by an application of a deownward force on said piano pedal.

* * * * *